(12) United States Patent
Boucard et al.

(10) Patent No.: US 9,471,538 B2
(45) Date of Patent: Oct. 18, 2016

(54) NETWORK ON A CHIP SOCKET PROTOCOL

(71) Applicant: QUALCOMM TECHNOLOGIES, INC., San Diego, CA (US)

(72) Inventors: Philippe Boucard, Le Chesnay (FR); Jean-Jacques Lecler, Cupertino, CA (US); Boris Boutillier, Montigny le Bretonneux (FR)

(73) Assignee: Qualcomm Technologies, Inc., San Diego, CA (US)

( * ) Notice: Subject to any disclaimer, the term of this patent is extended or adjusted under 35 U.S.C. 154(b) by 602 days.

(21) Appl. No.: 13/626,758

(22) Filed: Sep. 25, 2012

(65) Prior Publication Data

US 2014/0086246 A1 Mar. 27, 2014

(51) Int. Cl.
*G06F 15/78* (2006.01)
*G06F 13/364* (2006.01)
(Continued)

(52) U.S. Cl.
CPC ....... *G06F 15/7825* (2013.01); *G06F 11/0745* (2013.01); *G06F 13/4059* (2013.01); *G06F 13/364* (2013.01)

(58) Field of Classification Search
CPC  H04B 2203/5445; H04B 3/54; H04B 3/542; H04L 12/5601; H04L 12/5693; H04L 29/06; H04L 29/0653; H04L 29/0809; H04L 29/1232; H04L 29/06027; H04L 29/06068; H04L 29/06095; H04L 29/08072; H04L 29/08117; H04L 29/12009; H04L 45/00; H04L 47/10; H04L 47/30; H04L 47/32; H04L 47/2441; H04L 49/30; H04L 49/90; H04L 49/254; H04L 49/351; H04L 49/3009; H04L 61/2092; G06F 12/109; G06F 12/1009; G06F 12/10; G06F 13/385; G06F 13/387; G06F 13/409; G06F 13/4022; G06F 13/4027; G06F 13/4072; G06F 13/4086; H04W 8/26

USPC ....... 370/235, 389, 392, 419, 423, 463, 475; 709/230, 232; 710/100, 305; 711/206
See application file for complete search history.

(56) References Cited

U.S. PATENT DOCUMENTS 6,671,275 B1 * 12/2003 Wong .................. H04L 12/5693
370/389
6,826,191 B1 11/2004 Jones et al.
(Continued)

FOREIGN PATENT DOCUMENTS

EP 2333830 A1 6/2011
WO 2007033238 A2 3/2007

OTHER PUBLICATIONS

Bononi L., et al., "NoC Topologies Exploration based on Mapping and Simulation Models," Digital System Design Architectures, Methods and Tools, 10th Euromicro Conference on, Aug. 29-31, 2007, pp. 543-550.
(Continued)

*Primary Examiner* — John Pezzlo
*Assistant Examiner* — Dharmesh Patel
(74) *Attorney, Agent, or Firm* — Muncy, Geissler, Olds & Lowe, P.C.

(57) ABSTRACT

The invention is a transaction interface protocol wherein the interface protocol has a transaction identifier signal in each of the request and response channels. It is used between a target network interface unit (NIU) master and an initiator NIU slave that are directly connected through a transaction interface. The target NIU response channel uses the transaction ID signal to identify the entry in a context array associated with the corresponding request. The coupling of target NIU and initiator NIU enable the formation of an on-chip interconnect comprising multiple network-on-chip (NoCs) wherein the topology of the interconnect is simpler, smaller, faster, and has lower latency.

19 Claims, 10 Drawing Sheets

(51) Int. Cl.
  *G06F 11/07* (2006.01)
  *G06F 13/40* (2006.01)

(56) References Cited

U.S. PATENT DOCUMENTS

| | | | | |
|---|---|---|---|---|
| 6,944,039 | B1* | 9/2005 | Nataraj et al. | 365/49.17 |
| 8,027,256 | B1* | 9/2011 | Subramanian et al. | 370/231 |
| 8,087,064 | B1* | 12/2011 | Baum | 726/3 |
| 8,677,045 | B2* | 3/2014 | Mangano et al. | 710/310 |
| 8,713,234 | B2* | 4/2014 | Lakshmanamurthy et al. | 710/113 |
| 2003/0081624 | A1* | 5/2003 | Aggarwal et al. | 370/412 |
| 2004/0017820 | A1 | 1/2004 | Garinger et al. | |
| 2004/0019733 | A1 | 1/2004 | Garinger et al. | |
| 2005/0138252 | A1 | 6/2005 | Gwilt | |
| 2006/0021022 | A1 | 1/2006 | Krishna et al. | |
| 2006/0095920 | A1 | 5/2006 | Goossens | |
| 2007/0245033 | A1* | 10/2007 | Gavrilescu et al. | 709/230 |
| 2008/0317249 | A1* | 12/2008 | Bates et al. | 380/255 |
| 2010/0169896 | A1 | 7/2010 | Bennebroek et al. | |
| 2010/0191890 | A1* | 7/2010 | Hum et al. | 710/305 |
| 2011/0035523 | A1* | 2/2011 | Feero et al. | 710/110 |
| 2011/0289253 | A1* | 11/2011 | Mangano et al. | 710/310 |
| 2011/0302345 | A1* | 12/2011 | Boucard | H04L 47/10 710/123 |

OTHER PUBLICATIONS

International Search Report and Written Opinion—PCT/US2013/061295—ISAEPO—Jan. 10, 2014.

Radulescu A., et al., "An Efficient On-Chip NT Offering Guaranteed Services, Shared-Memory Abstraction, and Flexible Network Configuration'," IEEE Transactions on Computer-Aided Design of Integrated Circuits and Systems, Jan. 2005, vol. 24, No. 1, pp. 4-17, ISSN 0278-0070.

Daneshtalab M., et al., "A Low-Latency and Memory-Efficient On-chip Network," Networks-On-Chip (NOCS), 2010 Fourth ACM/IEEE International Symposium on, IEEE, Piscataway, NJ, USA, May 3, 2010 (May 3, 2010), pp. 99-106, XP031707260, ISBN: 978-1-4244-7085-3.

Kwon W-C., et al.,"In-network Reorder Buffer to Improve Overall NoC Performance while Resolving the in-order Requirement Problem," Design, Automation & Test in Europe Conference & Exhibition, 2009, Date '09, IEEE, Piscataway, NJ, USA, Apr. 20, 2009 (Apr. 20, 2009), pp. 1058-1063, XP032317643, DOI: 10.1109/DATE.2009.5090821 ISBN: 978-1-4244-3781-8.

Seifi M.R., et al., "A Clustered NOC in Group Communication," TENCON 2008-2008, TENCON 2008, IEEE Region 10 Conference, IEEE, Piscataway, NJ, USA, Nov. 19, 2008 (Nov. 19, 2008), pp. 1-5, XP031414565, ISBN: 978-1-4244-2408-5.

Supplementary European Search Report—EP13842232—Search Authority—The Hague—Jul. 12, 2016.

Yang X., et al., "NISAR: An AXI Compliant On-chip NI Architecture Offering Transaction Reordering Processing," Oct. 25, 2007 (Oct. 25, 2007), XP002759391, Retrieved from the Internet: URL:http://ieeexplore.ieee.org/stamp/stamp.sp?tp=&arnumber=4415774 [retrieved on Jun. 30, 2016].

* cited by examiner

NETWORK ON A CHIP SOCKET PROTOCOL

TECHNICAL FIELD

This disclosure is related generally to the field of semiconductor technology and more specifically to network-on-chip interconnects for systems on chip.

BACKGROUND

A network-on-chip (NoC) is a packet based interconnection for transporting read and write transactions between socket interfaces. A NoC comprises at least one initiator network interface unit (NIU) and at least one target NIU. Initiator NIUs convert transaction requests at the initiator socket interface to request packets and converts response packets to transaction responses at the initiator socket interface. Target NIUs convert request packets to transaction requests at the target socket interface and converts transaction responses at the target socket interface to response packets. Initiator NIUs and target NIUs are connected through a topology of switches. The packets may contain a field known as a sequence ID, which encodes some or all of: the initiator ID, target ID, transaction sequence ID, and transaction tag.

Conventional target NIUs, upon receiving transaction responses, perform a context array look up that requires a search of all context array entries and logic to deduce the oldest entry in the chain matching the response packet sequence ID. This requires a lot more logic silicon area than a simple index. More importantly, the logic for the chained list look-up is deeper in logic levels and therefore has longer, slower, timing paths. Therefore what is needed is a system and method for connecting two NoCs that has faster timing and less logic.

SUMMARY

In accordance with the various aspects and teachings of the present invention, a system and method are provided that connect two NoCs with less logic and faster timing paths using a transaction interface protocol. In accordance with the various aspects of the present invention, a transaction interface protocol is disclosed wherein the interface protocol has a transaction ID signal in each of the request and response channels. The protocol is used between a target NIU master and an initiator NIU slave that are directly connected through a transaction interface. The target NIU response channel uses the transaction ID signal to identify the entry in a context array associated with the corresponding request. The coupling of target NIU and initiator NIU enable the formation of an on-chip interconnect comprising multiple NoCs wherein the topology of the interconnect is simpler, smaller, faster, and has lower latency.

DETAILED DESCRIPTION

Figure 1:
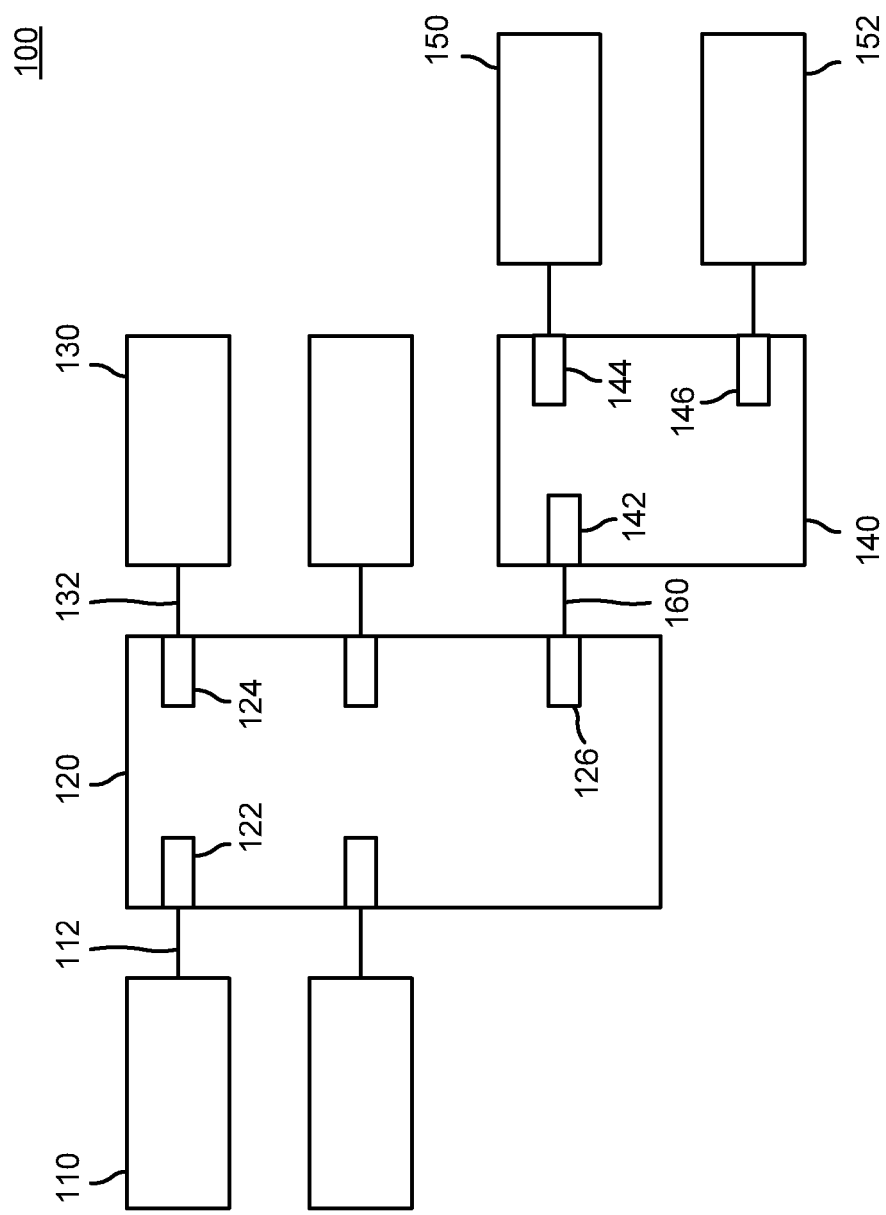
FIG. 1 illustrates a full chip interconnect

FIG. 1 shows a full chip interconnect comprising a first NoC 120 and a second NoC 140. The NoC 120 comprises an initiator NIU 122 that is coupled to an initiator 110 through a socket interface 112. The first NoC 120 is coupled to the initiator 110. The NoC 120 also comprises a target NIU 124 that is coupled to a target 130 through a socket interface 132. A target NIU 126 in the NoC 120 is coupled to an initiator NIU 142 in the NoC 140 through a socket interface 160. The NoC 140 comprises a first target NIU 144 coupled to a target 150 and a target NIU 146 coupled to a target 152.

Figure 2:
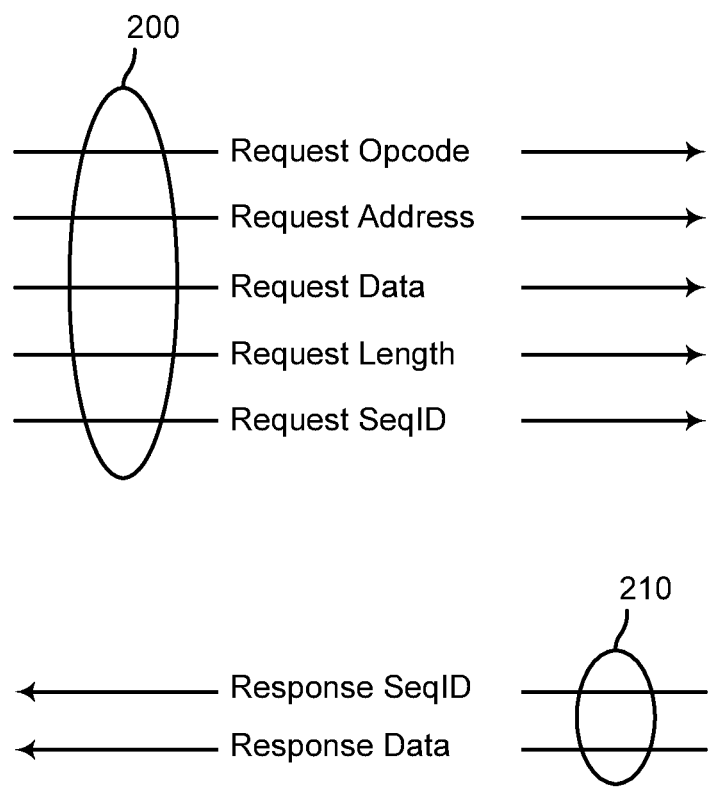
FIG. 2 illustrates a transaction interface protocol.

A NoC uses layered communication. Sockets present a transaction layer protocol such as the Advanced Microcontroller Bus Architecture (AMBA) Advanced eXtensible Interface (AXI) and Open Core Protocol (OCP). One transaction layer protocol is illustrated in FIG. 2. It has a request channel 200 with signals for opcode, address, write data, burst length, and sequence id. The protocol also has a response channel 210 with signals for data and sequence id. A transport layer protocol encapsulates the transaction information in one or more packets that are transferred through the topology of switches. Packets carry data along with a header that can have fields such as address bits, route id, opcode, and sequence id. A physical layer implements flow control and a simple connection of wires that transfer packet headers and data. A physical layer protocol can have signals such as ready, valid, and data.

NIUs can perform the functions of:
address decoding;
context allocation;
transaction splitting; and
context reassociation.

Figure 3:
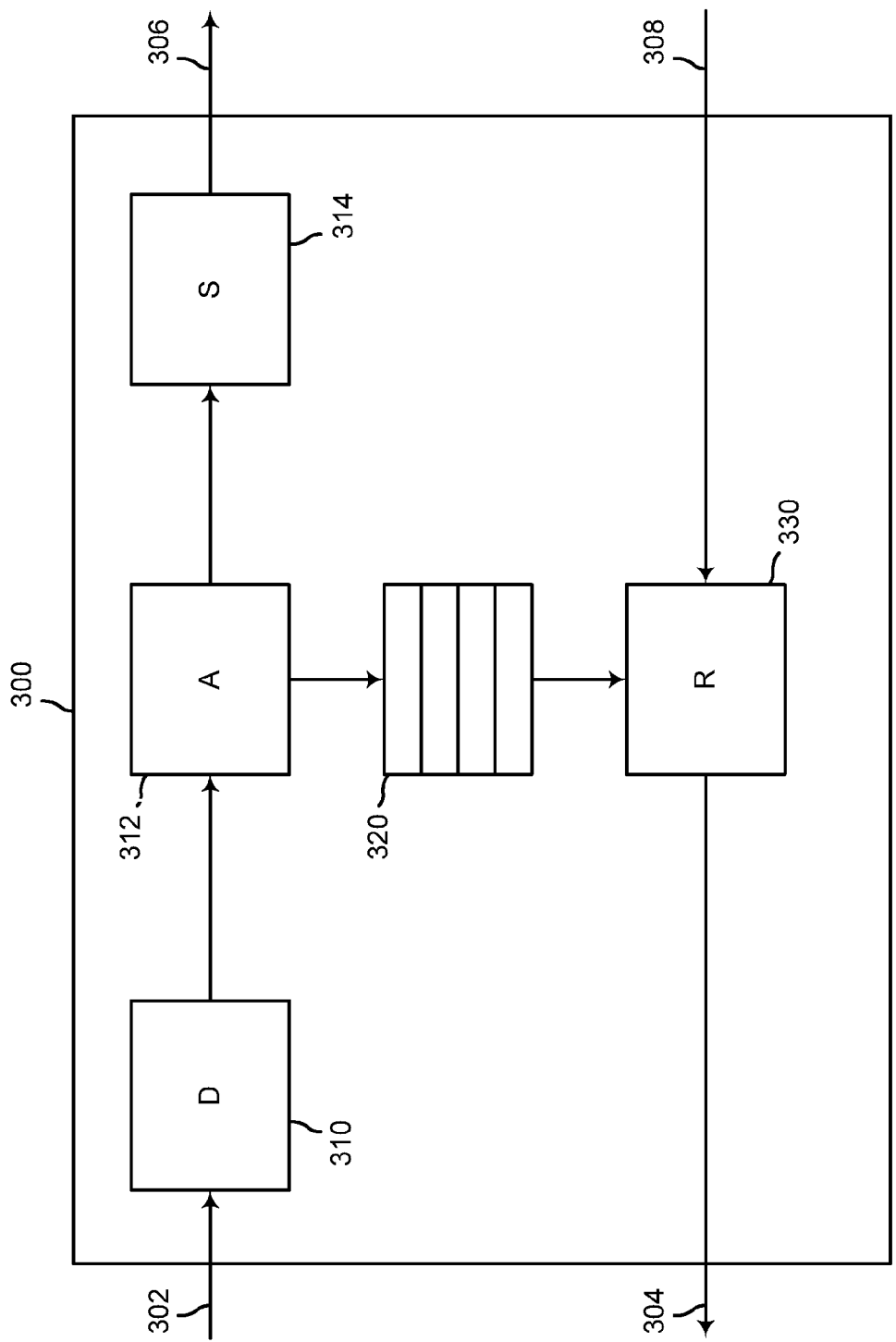
FIG. 3 illustrates an initiator NIU.

In accordance with one aspect of the present invention, one embodiment of an initiator NIU 300 is shown in FIG. 3. Within the initiator NIU 300, requests are accepted through a socket interface request channel 302. Responses are presented by the initiator NIU 300 through a socket interface response channel 304. Request packets are sent on a request transport interface 306 and response packets are received on a response transport interface 308. Transaction addresses are decoded in a decode unit 310 to produce a route id field in packet headers. Packets are associated with contexts in a context allocation unit 312. If necessary, transactions are split into multiple packets in a packet splitting unit 314. The packets are sent on the request transport interface 306.

The initiator NIU 300 includes the splitting unit 314. For transaction requests the splitting unit 314 causes the creation of a number of packets to transport the transaction. The initiator NIU 300 can split transactions into multiple packets in order to ensure a desired byte alignment, burst alignment, target address range boundaries, address interleaving, or protocol boundary requirements, such as the AXI requirement of bursts not to cross 4 KB aligned address boundaries.

A context array 320 comprises entries that are allocated to pending transactions. If the context array 320 is full then the initiator NIU 300 asserts backpressure on the socket interface request channel 302. The physical layer ready signal is deasserted. The context array 320 stores, among other information, the sequence id and opcode of each pending transaction. The context array 320 has four entries and therefore supports up to four pending transactions. When response packets are received on the response transport interface 308 a context reassociation unit 330 reassociates the packet with the context of the pending transaction. The reassociation by the reassociation unit 330 ensures that the sequence ID of the response on the response channel 304 of the initiator socket interface matches the sequence ID of the corresponding request.

Figure 4:
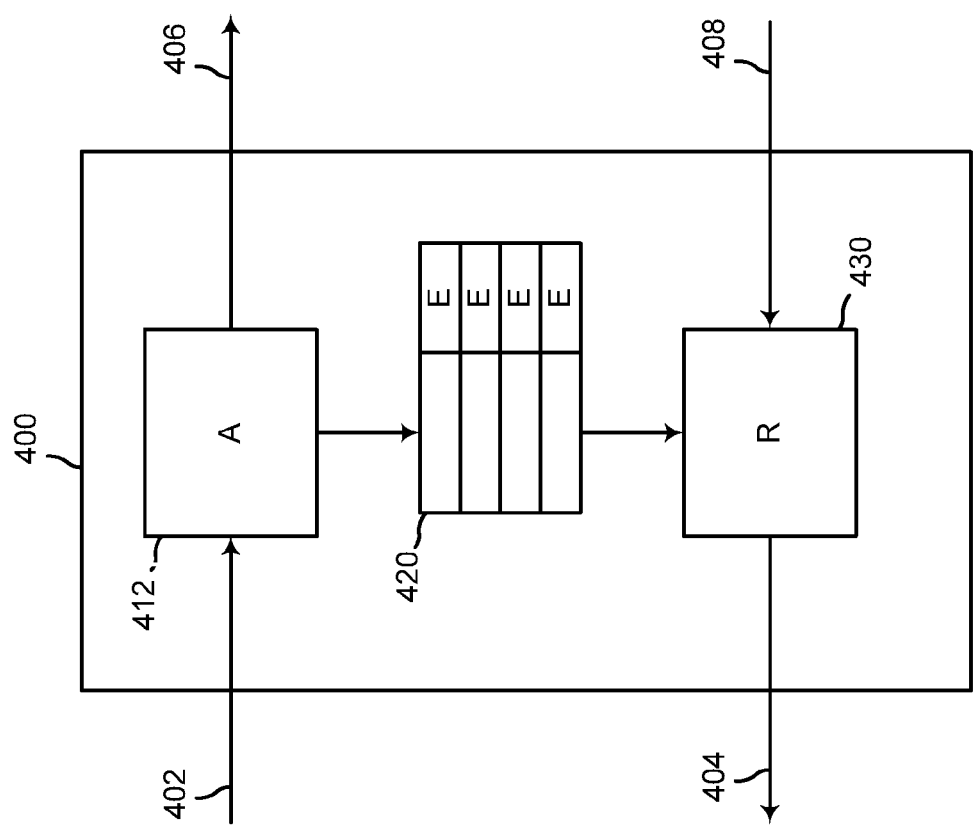
FIG. 4 illustrates a target NIU that stores echo fields.

In FIG. 4 a target NIU 400 is shown that can correspond with the initiator NIU 300. Request packets are accepted on a request transport interface 402 and response packets are sent on a response transport interface 404. Transaction requests are presented through a socket interface request channel 406 and transaction responses are accepted by the NIU through a socket interface response channel 408. The target NIU 400 includes a context allocation unit 412, a context array 420, and a context reassociation unit 430.

In this embodiment reassociation of packets to the context of their pending transactions is simple. The packet header includes an echo field that is produced by the allocation unit 312 in the initiator NIU 300 and echoed back from the target NIU 400 unaltered. The echo field stores an index into the context array 320. The context array is accessed as a table lookup. The echo field E is stored in the target NIU context array 420 while each transaction from the target NIU 400 is pending. The echo field, which is part of the transport layer protocol, is included in the header of response packets for the transaction.

The target NIU 400 reassociation unit 430 does not have the luxury of an index the echo field. State of the art industry standard transaction level protocols, such as the target NIU 400 uses at the target socket interface, do not include echo information. Responses on the socket interface response channel 408 must be reassociated with the header information stored from the request packet, stored in the context array 420 in order to form the response packet.

The target NIU reassociation unit 430 must perform a lookup of the appropriate context array entry based on the oldest transaction with the sequence ID of the response packet. The context array 420 is organized as a chained list of pending transactions with a chain for each sequence ID.

Figure 5:
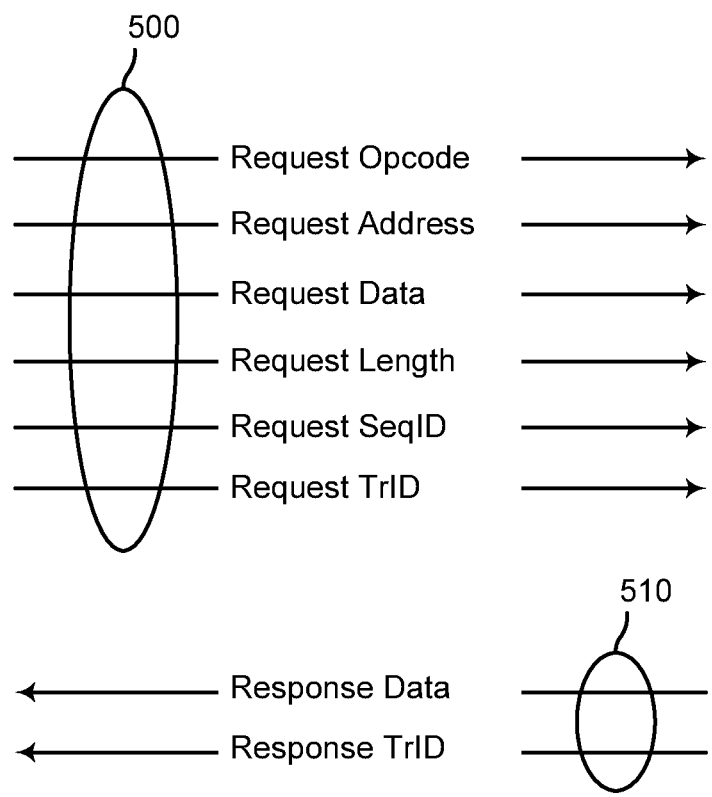
FIG. 5 illustrates a transaction interface protocol, according to the teachings of the present invention, with a transaction ID signal.

An aspect of the invention is shown in FIG. 5. A convention transaction interface, including signals for opcode, address, write data, burst length, and sequence id, is enhanced in the request channel 500 with the additional signals Request TrID and in the response channel 510 with Response TrID. The TrID signals convey a transaction ID. This enhanced signal interface is used by an enhanced NoC socket protocol. In one embodiment of the invention the master of the socket interface asserts a value on TrID when a transaction request is presented and the slave of the interface gives exactly the same value on the Response TrID signal when presenting the transaction response. In accordance with another aspect of the present invention, the slave of the interface gives a value on the Response TrID signal that is transformed from the corresponding value Request TrID value. A transformation can be the changing of the order or sense of bits. The key is associability to a unique master context array entry.

In one embodiment, each of multiple pending transactions has a unique TrID value. In another embodiment, TrID values are reused for transactions that must be executed in order, despite downstream buffering. In another embodiment, TrID values are given for successive transactions in a non-sequential order.

In one embodiment of the invention, the asserted TrID value is mapped from a field in a packet header within the upstream NoC. In one embodiment the TrID value is mapped to a field in a packet header within the downstream NoC.

An optimal protocol configuration varies from one NoC to another and from one chip to another. In one embodiment of the invention, the NoC socket protocol is configurable at chip design time. Configuration options include, among others, the width of the Request and Response TrID signals. The register transfer level (RTL) language logic is generated by a configuration tool. The tool is used by chip designers to generate customized configurations and produce RTL language code for chip synthesis.

Figure 6:
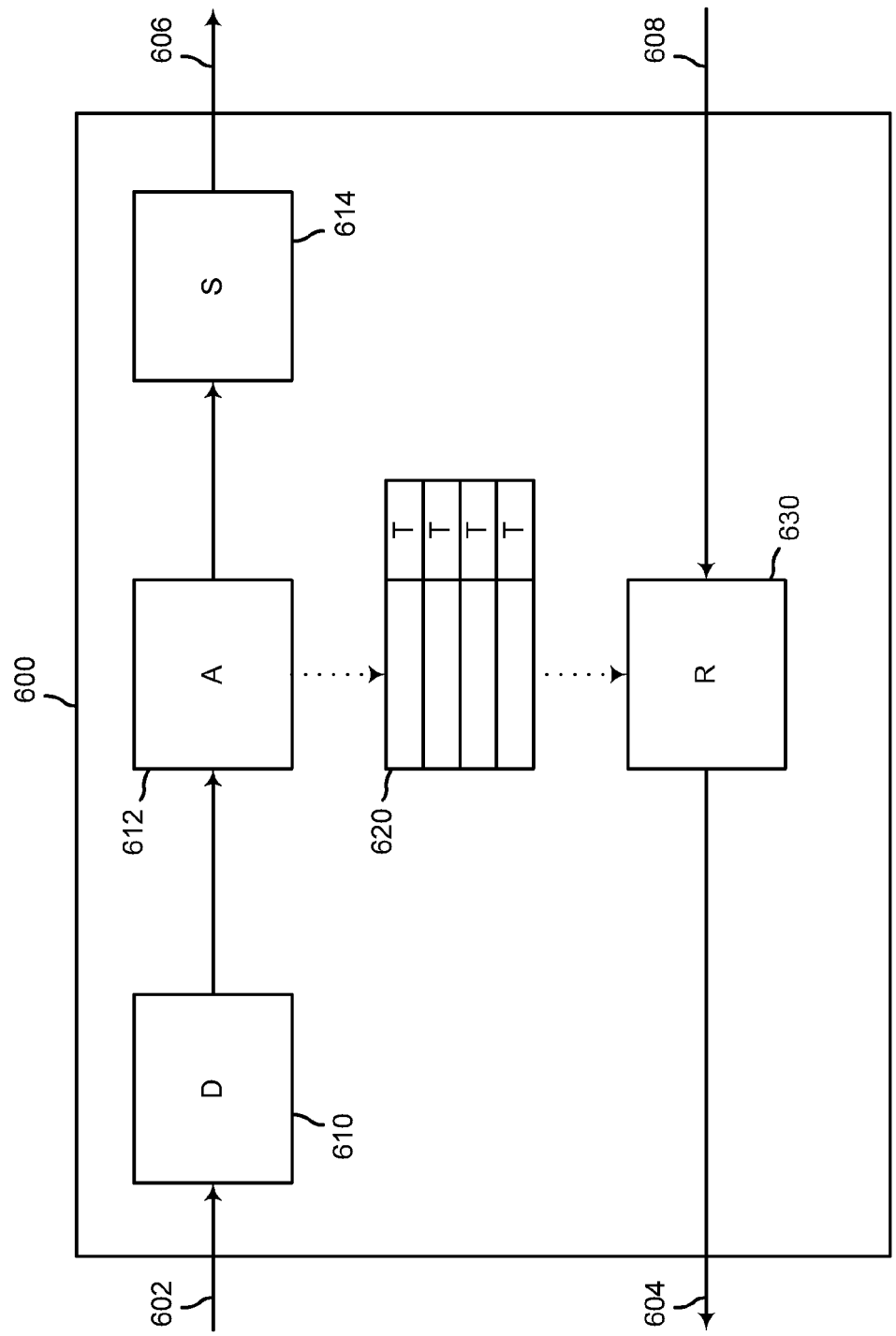
FIG. 6 illustrates an initiator NIU, according to the teachings of the present invention, which stores a transaction ID.

An aspect of the invention is shown in FIG. 6. Within an initiator NIU 600 requests are accepted through a socket interface request channel 602. Responses are presented by the NIU 600 through a socket interface response channel 604. Request packets are sent on a request transport interface 606 and response packets are received on a response transport interface 608. Transaction addresses are decoded in a decode unit (D) 610 to produce a route id field in packet headers. Packets are associated with contexts in a context allocation unit A 612. If necessary, transactions are split into multiple packets in a packet splitting unit S 614. The packets are sent on the request transport interface 606.

A context array 620 comprises entries that are allocated to pending transactions. If the array is full, then the initiator NIU 600 asserts backpressure on the socket interface request channel 602. In that state the physical layer ready signal is deasserted. The context array 620 stores, among other information, the sequence id of each pending transaction. The context array 620 has four entries and therefore supports up to four pending transactions. When response packets are received on the response transport interface 608, a context reassociation unit (R) 630 reassociates the packet with the context of the pending transaction.

This aspect of the invention diverges from that of conventional NIUs in that the context array 620 carries TrID information. In one embodiment, the context array stores a TrID field (T) with each array entry. The value stored in the field is that of a signal on the socket interface request channel 602 at the time that a transaction request is granted. When an associated response is presented on the socket interface response channel, a signal on the interface is driven from the TrID field in the context array entry associated with the transaction for which the response is presented.

In one embodiment the TrID field of the context array is included in the header of packets generated to transport the associated transaction. It forms the Echo field in the packet header.

In another embodiment, the master and slave side of the socket interface have the same number of contexts and the TrID values are unique per context. The TrID from the master forms a direct index into the context array in the initiator NIU. The request packet header produced by and the response packet header received by the initiator NIU have an Echo field that is a direct index into the context array. In this way, no storage is required for TrID value in the context array and no remapping is required between TrID signals and packet header Echo fields.

Figure 7:
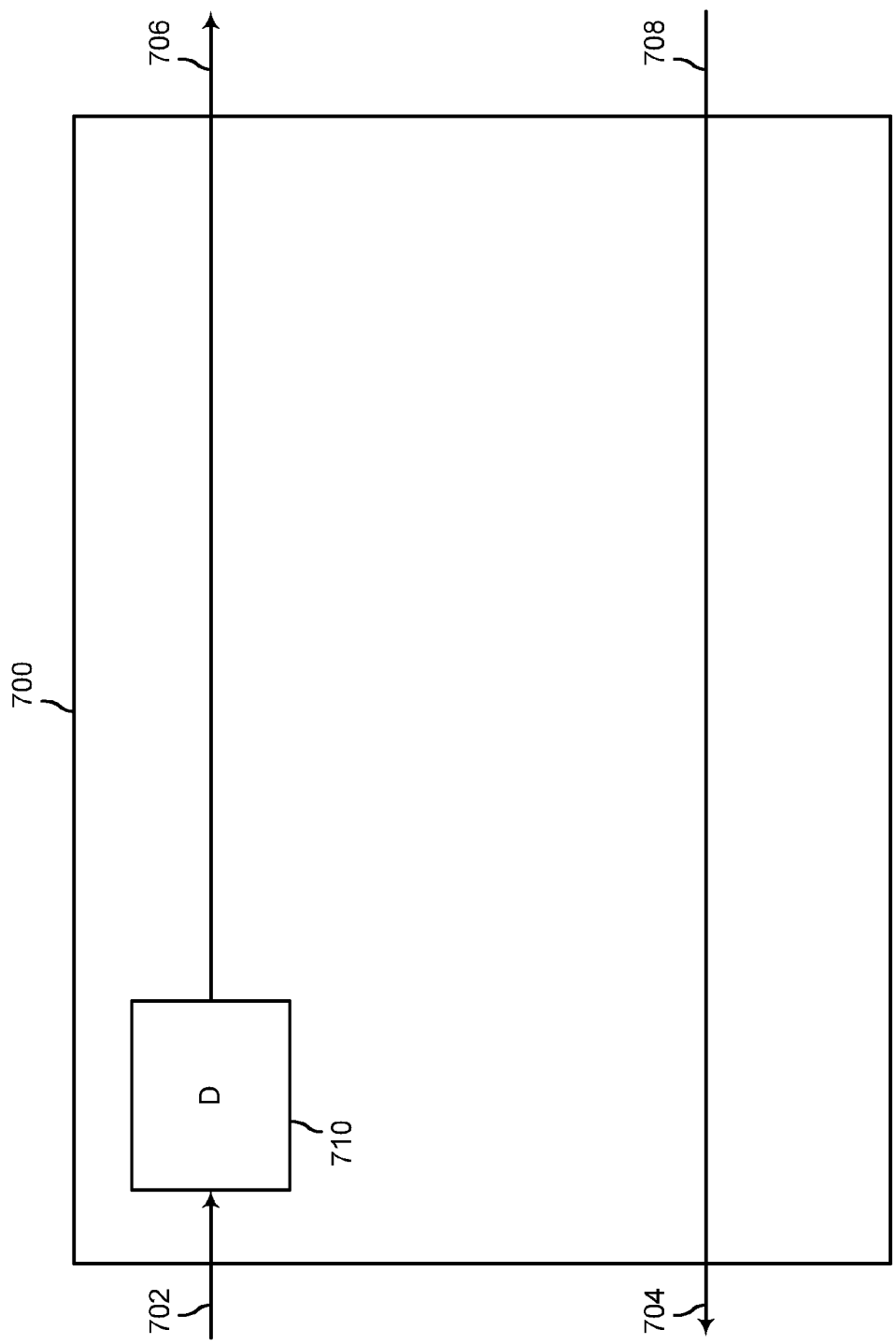
FIG. 7 illustrates an initiator NIU, according to the teachings of the present invention that has no context allocation unit, splitting unit, context array, or reassociation unit.

Referring now to FIG. 7, an initiator NIU 700 is connected to an upstream target NIU through a NoC to NoC socket having a request channel 702, which is connected to a decode unit (D) 710, and a response channel 704. The upstream target NIU (not shown) supports the same number of contexts as the initiator NIU 700. In this case, a context array is not needed within the initiator NIU. Contexts are managed only in the target NIU. The TrID value of the NoC socket protocol is used directly as the Echo field in packets sent on a NoC transport request channel 706 and received on a NoC transport response channel 708. The echo field of response packets directly drives the response TrID signal on the socket response channel 704. This arrangement depends on a configuration of the NIU that requires no response word reassembly or other response attributes that are specific to their corresponding requests.

An optimal configuration of an initiator NIU varies from one NoC to another and from one chip to another. In one embodiment of the invention, the initiator NIU is configurable at chip design time. Configuration options include, among others, the width of the request and response TrID signals, the width of the TrID field in the context array of the NIU, the number of context array entries the number of pending transactions, and the mapping of TrID signals to a packet header Echo field. The number of pending transactions should be matched between an initiator NIU and its connected IP. If an initiator NIU supports more pending transactions than the IP then it will never use all of its context array entries. If the initiator NIU supports fewer pending transactions than the IP then it will assert back pressure on the IP even if there is network availability in the NoC. If the number of pending transactions is not a power of two then the upstream target NIU and downstream initiator NIU must agree on the encoding of valid TrIDs. If TrIDs are unique to transactions and the number of unique TrID encodings is less than the maximum number of pending transactions then the downstream initiator NIU must correctly reassociate responses to the TrID of their corresponding requests.

The initiator NIU logic, described in a RTL language, is generated by a configuration tool. The tool is used by chip designers to generate customized configurations and produce RTL language code for chip synthesis.

A chip design strategy that is beneficial for synthesis and layout is to create one or more client NoCs and one memory NoC that supports interleaved access to one or more memories such as double data rate DDR dynamic random access memory DRAM. In such a design, the memory NoC has one or more NoC to NoC initiator NIUs to receive and service requests from the client NoCs. An embodiment of initiator NIU for such a configuration comprises a reorder buffer. A reorder buffer is like an extended context array with an ability to store partial transaction responses. In such an embodiment, TrID may be stored in the context array within the reorder buffer.

In an on-chip interconnect comprising an upstream NoC and a downstream NoC that share an interface, one embodiment of an initiator NIU in the downstream NoC that is coupled to a target NIU in the upstream NoC consists of no splitting unit. Splitting is performed at one or more initiator NIUs in the upstream NoC with knowledge of the splitting requirements of the initiator NIU in the downstream NoC. In this way the embodiment of the initiator NIU in the downstream NoC is smaller, faster, and has less transaction latency. Some parameters of the downstream NoC considered by the initiator NIU of the upstream NoC are the address map seen by the target NIU of the downstream NoC, the maximum burst length of targets in the downstream NoC, the data width of target socket interfaces in the downstream NoC, and downstream NoC target socket protocol restrictions on bursts crossing boundaries such as the AXI protocol restriction that bursts not cross a 4k byte aligned address. Eliminating the splitting logic of the initiator NIU of the downstream NoC minimizes logic area, timing path length, and transaction latency.

An aspect of the invention relates to the embodiment of the target NIU that transacts with the initiator NIU at the NoC socket interface. In one embodiment, a target NIU that uses the NoC socket protocol maps the TrID signal as a function of an Echo field in a packet header. In the simplest case the mapping function is a direct copy.

Figure 10:
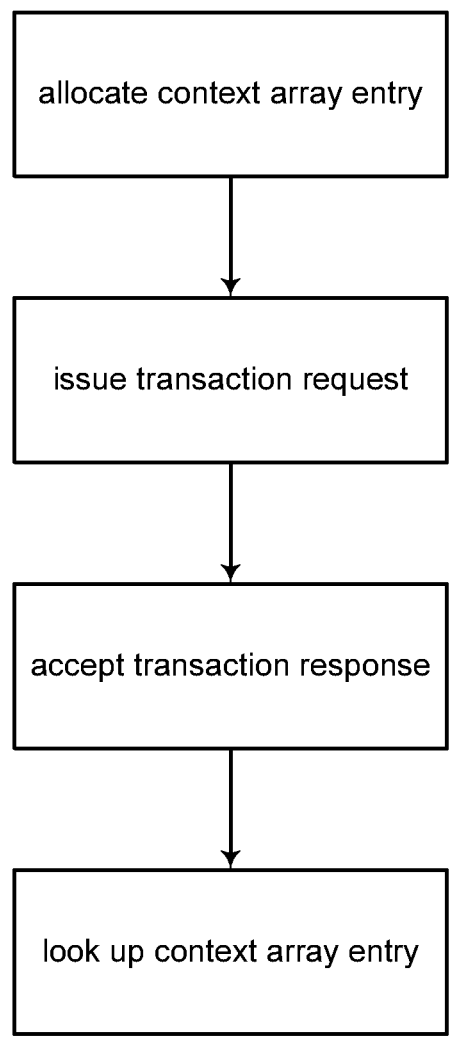
FIG. 10 shows a flowchart for the method of operation of one embodiment of the target NIU.

The method of operation of one embodiment of the target NIU is shown in FIG. 10. The target NIU comprises a context array. Array entries store information about the transaction, which can include information from the request packet that caused the generation of the transaction. For each transaction request an entry in the array is allocated. The value of the Response TrID signal at the socket interface forms an array index. It points to the array entry that holds the information related to the corresponding transaction. The number of entries in the context array defines a maximum number of simultaneously pending transactions that can be supported by the target NIU. The number of bits of the TrID signal, which forms an unsigned binary index into the array, is the base two logarithm of the number of pending transactions, rounded up to an integer. Every pending transaction has a unique TrID value.

An optimal configuration of a target NIU varies from one NoC to another and from one chip to another. In one embodiment of the invention, the target NIU is configurable at chip design time. Configuration options include, among others, the width of the request and response TrID signals, the number of context array entries, the number of pending transactions, and the mapping of TrID signals to a packet header Echo field. The number of pending transactions should be matched between a target NIU and its connected IP. If a target NIU supports more pending transactions than the IP then it will have more context array entries than necessary. If the target NIU supports fewer pending transactions than the IP then it will never use all of its context array entries. For a socket interface between two NoCs, it is advisable to ensure that the number of pending transactions, and therefore the number of context array entries, is the same for the upstream target NIU and the downstream initiator NIU.

The target NIU logic, described in a RTL language, is generated by a configuration tool. The tool is used by chip designers to generate customized configurations and produce RTL language code for chip synthesis.

The combination of an initiator NIU and target NIU that use the enhanced NoC socket protocol enables the implementation of a superior multi-NoC composition of an upstream NoC and downstream NoC within an on-chip interconnect. In a single conventional NoC a packet header includes an Echo field that is used by an initiator to efficiently map responses to context array entries. The NoC composition uses the enhanced NoC socket protocol above for the socket interface between a target NIU of an upstream NoC and a connected initiator NIU of a downstream NoC. In one embodiment of the invention the value of the TrID signal of the transaction interface carries the Echo field of request packet of the upstream NoC to the initiator NIU of the downstream NoC. The initiator NIU of the downstream NoC in turn uses the value of the TrID signal as the Echo field within one or more packets that it creates to carry out the protocol interface transaction.

Figure 9:
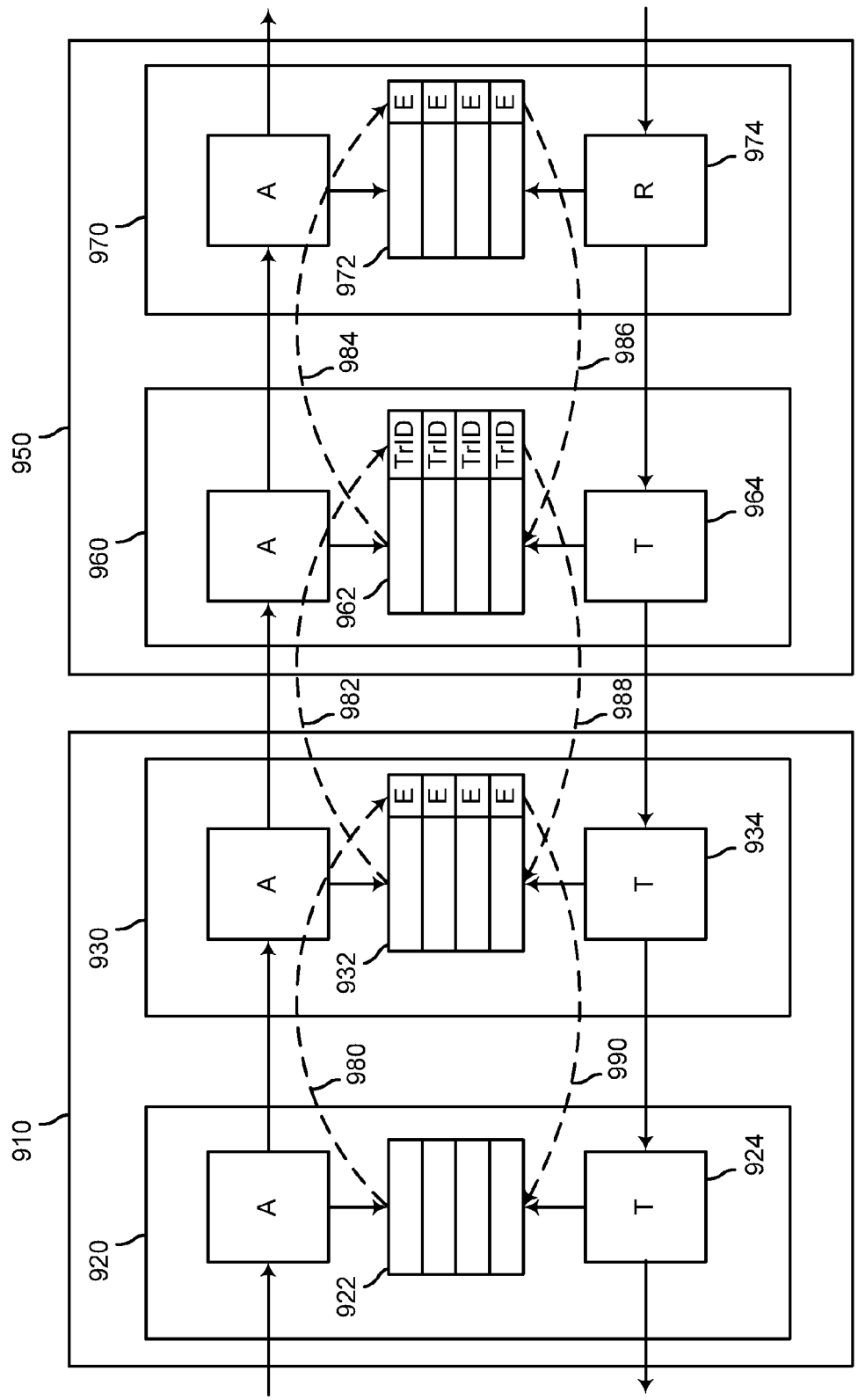
FIG. 9 shows a NoC in according to the teachings of the present invention.

In accordance with one aspect of the present invention, an embodiment of a NoC composition is shown in FIG. 9 and includes an upstream NoC 910 coupled to downstream NoC 950, both together transmitting a transaction request from left to right and a response from right to left. Initiator NIU 920 receives a transaction request from an initiator IP (not shown), allocates a context entry in context array 922, and sends a request packet to target NIU 930. Target NIU 930 receives the request packet and allocates a context entry in context array 932 that includes the Echo value from the request packet header. Target NIU 930 issues transaction request 982, including a TrID signal, to initiator NIU 960. Initiator NIU 960 allocates a context entry in context array 962, in which it stores the TrID according to the invention. Initiator NIU 960 sends request packet 984 to target NIU 970. Target NIU 970 receives the request packet and allocates a context entry in context array 972 that includes the Echo value from the request packet header. Target NIU 970 issues a transaction request to a target IP (not shown). The target IP issues a transaction response to target NIU 970, wherein reassociation logic 974 retrieves the context entry corresponding to the transaction from context array 972. Target NIU 970 sends response packet 986 to initiator NIU 960, wherein table lookup module 964 uses the Echo packet header field to simply retrieve the context entry corresponding to the transaction from context array 962. According to the various aspects of the present invention, initiator NIU 960 sends transaction response 988 to target NIU 930, wherein table lookup module 934 uses the TrID signal to simply retrieve the context entry corresponding to the transaction from context array 932. Target NIU 930 sends response packet 990 to initiator NIU 920, wherein table lookup module 924 uses the Echo packet header field to simply retrieve the context entry corresponding to the transaction from context array 922. Initiator NIU 920 sends the transaction response to the initiator IP.

In one embodiment the value of the TrID signal is stored in the context array of the initiator NIU of the downstream NoC. The stored TrID value is presented at the transaction interface with the response. In another embodiment TrID is not stored but implicit in the echo field.

In one embodiment the initiator NIU of the upstream NoC, configured with awareness of the address map and transaction protocol support of targets in the downstream NoC, performs all required splitting of initiator IP requests into multiple packets. The initiator NIU of the downstream NoC therefore requires no packet splitting logic. This has the further benefit of a simple mapping of the Echo field of the upstream NoC packet header to the Echo field of the downstream NoC packet header. As a result, context management within the target NIU of the upstream NoC is simplified to a table access. That is a much faster structure than the chained list lookup of a conventional NoC composition. In such a configuration the complexity of address decoding, splitting, and context association is present in the upstream initiator NIU, near the initiator IP, and generally distributed away from congested parts of the chip. The upstream initiator NIU must therefore know certain properties of the targets of the downstream NoC such as address cross boundary restrictions and maximum bust lengths, among others.

In another embodiment the initiator NIU of the upstream NoC is unaware of the address map implemented in the initiator NIU of the downstream NoC. The downstream NoC has a non-trivial address decode module and splitting and association logic as necessary. In typical implementations a cross boundary parameter for the socket interface is agreed between the upstream and downstream NoC such that the upstream initiation NIU will split transactions in a way that the downstream initiation NIU need not. In such a configuration the complexity of address decoding, splitting, and context association is present in the downstream NoC. In many chips, downstream NoCs are closer to performance critical memories and necessarily more central to the chip. Though such a configuration creates congestion, it allows flexibility for the design of the memory subsystem, isolating its particular details from the upstream client NoCs.

An aspect of the disclosed invention relates to the method of managing contexts within the target NIU of a socket interface between a target NIU of an upstream NoC and an initiator NIU of a downstream NoC. One embodiment comprises allocating a free context for each new incoming Request using a pooling or a stack-based algorithm. The context is identified by an Echo and/or a sequence ID field within the packet header. Each context array entry contains the necessary information for building the response header:

route ID;

opcode; and echo.

The target NIU issues a request for a transaction, associated with the allocated context array entry. The request includes a Request TrID signal. The target NIU assigns the signal according to the index of the context array entry that is allocated. Eventually the target NIU receives a response. The response includes a Response TrID signal. The target NIU then uses the value of the Response TrID signal as an index value to look up the associated entry of the context array. The context is freed when either the header of a write response transport packet is sent or the last data of a read response transport packet is sent.

In another embodiment the Response TrID is a transformed copy of the Request TrID signal for the same transaction. One such transformation is the reordering of bits. This enables the use of bank based storage in the context array. Another transformation is the addition of information indicating which of a number of data words in a burst, separated by response interleaving, the partial response word is delivering.

An aspect of the invention is the elimination of the needs to perform reassociation of transactions to context array entries in the target NIU of the socket interface between NoCs. This benefit is furthermore useful for types of target IPs other than NoCs such as memory controller. Memory controller, like downstream NoC initiator NIUs, can also be designed to respond with simply mapped TrID signals that do not require complex reassociation logic. In general, target NIUs reassociate transaction responses to context array entries based on chained list of a sequence ID. This requires a costlychained list lookup. With a NoC to NoC socket, using a TrID signal on a transaction interface allows a simple table index lookup to reassociate responses with context array entries. For a transaction requested by an initiator IP, passing through any number of NoC to NoC sockets, only one reassociation chained list lookup is required. That is at the target NIU connected to the target IP. All intermediate target NIUs and initiator NIUs of NoC to NoC sockets can use simple indexing of echo bits from packet header fields and TrID bits of NoC socket protocol interfaces.

Figure 8:
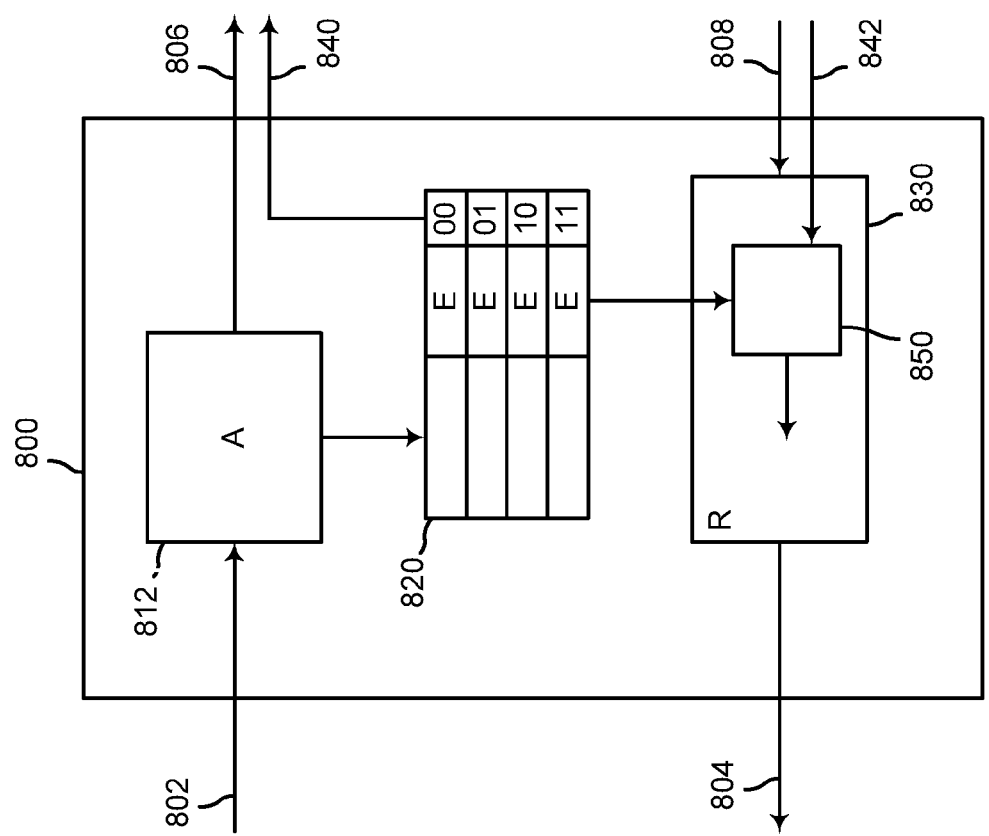
FIG. 8 shows a target NIU according to the teachings of the present invention.

An embodiment of a target NIU is shown in FIG. 8. Target NIU 800 is shown that can correspond with an initiator NIU such as initiator NIU 600 or 700. Request packets are accepted on a request transport interface 802 and response packets are sent on a response transport interface 804. Transaction requests are presented through a socket interface request channel 806 and transaction responses are accepted by the NIU through a socket interface response channel 808. Target NIU 800 comprises a context allocation unit 812, a context array 820, and a context reassociation unit 830. A unique address for the table entry chosen by the context allocation unit 812 is sent as request TrID signal 840. Response TrID signal 842 is used as the selector in a mux 850 to select the echo field E of the entry chosen by the context allocation unit 812. This is a lookup mechanism that eliminates the need for the traditional complex reassociation logic as well as simplify the overall system and enhance system performance.

Chips are increasingly complex. They can no longer be designed by a single engineer or even a single team of engineers. Chips are necessarily designed modularly. It is therefore necessary to design modules using separate NoCs. Top level integration of within the full chip requires interfaces between NoCs. Using a NoC socket protocol allows NoC interfaces to run faster and/or run with fewer pipe stages to close timing. Furthermore, using a NoC socket protocol allows teams to design independently without the need for a time consuming process of negotiating between teams on the best interface. In one embodiment a tool is used to configure and generate the NoC RTL. It automatically generates an optimized protocol specifically for each socket interface between NoCs. Among other parameters, the configuration determines the size of the TrID signal and the number of pending transactions supported.

The tool also accepts the address map of targets within the address space of initiators for each NoC. Using the address map of a downstream NoC the tool determines the type of splitting required to produce the one or more packets in the downstream NoC needed to complete a transaction. The tool configures the initiator NIU RTL to implement such packet splitting. The effect of this is to create a unified address map in the address decoding of initiator NIUs. This is done without requiring separate design teams to know the address map of each other's NoC.

The tool also generates a verification testbench and tests to exercise all transaction types on all routes between initiators and targets with interconnectivity. With awareness of the NoC composition, the tool generates a unified testbench and tests to exercise accesses from each initiator to all accessible targets even through NoC to NoC sockets and with the resulting hierarchies of address mappings.

The tool also generates a performance exploration simulation environment. With awareness of the of NoC composition, it generates a simulation environment that models the passage of transactions and their associated packets between NoCs.

All of these benefits are achieved without a need for communication between teams. A risk of designs by separate teams without communication is for circular dependencies between modules. Because the tool has awareness of the NoC composition and the configuration of each component NoC it automatically performs circular dependency checks such as circular initiator to target connectivity through NoC to NoC sockets. Such dependencies can cause deadlock, but are often difficult to detect even in thorough verification environments. The tool automates the checking based on its high level knowledge of NoC connectivity and configuration.

A further benefit of easy integration of multiple NoCs is that the transport packet header format in a NoC is optimized based on its configuration. For example a NoC with many initiators and targets requires a larger routeID field or a NoC with many sideband signals will require a larger user bit field. A large header increases the size of datapaths and complexity of logic throughout the NoC. By using multiple NoCs, with a transaction interface in between, the header formats of the separate NoCs can be optimized separately and generally made smaller.

It is to be understood that this invention is not limited to particular embodiments or aspects described, as such may vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Any methods and materials similar or equivalent to those described herein can also be used in the practice or testing of the present invention.

All publications and patents cited in this specification are herein incorporated by reference as if each were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the various aspects and principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

The invention claimed is:

1. An initiator network interface unit comprising:
a first channel that accepts a transaction identifier signal and a sequence identifier signal with a request, the transaction identifier signal is configured to indicate a unique transaction identifier and the sequence identifier signal is configured to indicate a unique sequence identifier different from the unique transaction identifier;
a second channel that provides the transaction identifier signal with a response; and
a context array having a capacity to store a plurality of entries corresponding to a plurality of pending transactions, wherein a backpressure is asserted on the first channel and a physical layer ready signal is deasserted upon detecting that the capacity of the context array is full.

2. The initiator network interface unit of claim 1 that maps the transaction identifier signal accepted with the request to a field of a request packet header.

3. The initiator network interface unit of claim 1 that maps a field of a response packet header to the transaction identifier signal provided with the response.

4. The initiator network interface unit of claim 3 wherein the mapping function is a direct copy.

5. The initiator network interface unit of claim 1 wherein a value of the transaction identifier signal is mapped to a packet header field.

6. The initiator network interface unit of claim 1 wherein a value of the transaction identifier signal has at least as many bits as log2 of a maximum number of pending transactions.

7. The initiator network interface unit of claim 1 wherein a number of pending transaction have unique values of the transaction identifier signal.

8. The initiator network interface unit of claim 1 wherein the network interface unit is configurable.

9. The initiator network interface unit of claim 1 wherein the network interface unit is generated by a tool.

10. The initiator network interface unit of claim 1 comprising a reorder buffer operably connected to the second channel.

11. The initiator network interface unit of claim 1 consisting of no splitting unit.

12. A system comprising:
a first network on chip including an initiator network interface unit, wherein the initiator network interface unit comprises:
a packet splitting unit;
a socket interface request channel that accepts a transaction request that includes a transaction identifier signal and a sequence identifier signal, the transaction identifier signal is configured to indicate a unique transaction identifier and the sequence identifier signal is configured to indicate a unique sequence identifier different from the unique transaction identifier; and
a context array having a capacity to store a plurality of entries corresponding to a plurality of pending transactions, wherein a backpressure is asserted on the socket interface request channel and a physical layer ready signal is deasserted upon detecting that the capacity of the context array is full; and
a second network on chip, operably connected to the first network on chip,
wherein splitting performed by the packet splitting unit is based, at least in part, on one or more parameters of the second network on chip.

13. The system of claim 12 wherein at least one parameter of the one or more parameters is an address map.

14. The system of claim 12 wherein at least one parameter of the one or more parameters is a maximum burst length.

15. An on-chip interconnect comprising:
an upstream network on chip;
a first initiator network interface unit within the upstream network on chip, the first initiator network interface unit comprising:
a socket interface request channel that accepts a transaction request that includes a transaction identifier signal and a sequence identifier signal, the transaction identifier signal is configured to indicate a unique transaction identifier and the sequence identifier signal is configured to indicate a unique sequence identifier different from the unique transaction identifier; and
a context array having a capacity to store a plurality of entries corresponding to a plurality of pending transactions, wherein a backpressure is asserted on the socket interface request channel and a physical layer ready signal is deasserted upon detecting that the capacity of the context array is full;
a first target network interface unit within the upstream network on chip;
a first address mapping of the first target network interface unit within an address space of the first initiator network interface unit;
a downstream network on chip;
a second initiator network interface unit within the downstream network on chip operably coupled to the first target network interface unit;
a second target network interface unit within the downstream network on chip;
a second address mapping of the second target network interface unit within an address space of the second initiator network interface unit; and
a packet splitting unit within the first initiator network interface unit that splits packets according to the second address mapping.

16. A method of managing contexts within a target network interface unit of a network-on-chip comprising:
allocating a context array entry to a context array that has a capacity to store a plurality of entries corresponding to a plurality of pending transactions;
detecting whether the capacity of the context array is full;
issuing a transaction request
including a request transaction context array entry identifier with the transaction request on a socket interface request channel;

asserting a backpressure on the socket interface request channel and deasserting a physical layer ready signal upon detecting that the capacity of the context array is full;

accepting a transaction response with a transaction response identifier that is configured to indicate a unique value; and using the transaction response identifier to look up the context array entry.

17. The method of claim 16 wherein the request transaction context array entry identifier is transformed in the transaction response identifier.

18. A method of transporting transactions through a composition of network-on-chips comprising:

reassociating a transaction response to a first entry of a first context array in a first target network interface unit in a first network on chip, the first context array configured to store a unique transaction identifier and a unique sequence identifier different from the unique transaction identifier;

mapping an echo field of a packet header from the first entry;

mapping a transaction identifier signal from the echo field of the packet header, the transaction identifier signal is configured to indicate the unique transaction identifier;

in a second context array in a second target network interface unit of a second network on chip that has a capacity to store a plurality of entries corresponding to a plurality of pending transactions, detecting whether the capacity of the second context array is full, the second context array configured to store the unique transaction identifier and the unique sequence identifier;

asserting a backpressure on a socket interface request channel and deasserting a physical layer ready signal upon detecting that the capacity of the second context array is full; and using a value of the transaction identifier signal to index into a second entry of the second context array upon detecting that the capacity of the second context array is not full.

19. The method of claim 18 further comprising:

mapping a second echo field of a second packet header from the second entry; and indexing into a third context array using the second echo field.

* * * * *